United States Patent
Mikawa

(10) Patent No.: US 9,431,743 B2
(45) Date of Patent: Aug. 30, 2016

(54) CONNECTOR

(71) Applicant: JAPAN AVIATION ELECTRONICS INDUSTRY, LIMITED, Shibuya-ku, Tokyo (JP)

(72) Inventor: Kazuya Mikawa, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 14/918,091

(22) Filed: Oct. 20, 2015

(65) Prior Publication Data

US 2016/0164211 A1 Jun. 9, 2016

(30) Foreign Application Priority Data

Dec. 5, 2014 (JP) ................................. 2014-247320

(51) Int. Cl.
*H01R 24/00* (2011.01)
*H01R 13/42* (2006.01)
*H01R 12/70* (2011.01)

(52) U.S. Cl.
CPC .......... *H01R 13/42* (2013.01); *H01R 12/7076* (2013.01)

(58) Field of Classification Search
CPC ........................... H01R 27/00; H01R 13/6215
USPC ................ 439/630, 363, 326, 341, 74, 76.1
See application file for complete search history.

(56) References Cited

U.S. PATENT DOCUMENTS

| 7,090,546 B2* | 8/2006 | Zheng ................. H01R 13/422 439/862 |
| 7,329,146 B2* | 2/2008 | Yang ................. H01R 12/7029 439/570 |
| 2005/0130510 A1* | 6/2005 | Zheng ................... H01R 12/57 439/862 |
| 2015/0294125 A1 | 10/2015 | Mikawa et al. |

FOREIGN PATENT DOCUMENTS

| JP | 2009129890 A | 6/2009 |
| JP | 4733610 B2 | 7/2011 |
| JP | 5718506 B1 | 5/2015 |

* cited by examiner

*Primary Examiner* — Phuongchi T Nguyen
(74) *Attorney, Agent, or Firm* — Holtz, Holtz & Volek PC

(57) ABSTRACT

A connector comprises a contact and a holding member. The contact has a held portion, a pressed portion and a protected portion. The holding member has a holding portion holding the held portion. Moreover, the holding member has a protection portion and a receiving portion arranged in a front-rear direction. The protection portion is located above the protected portion. When seen along an upper-lower direction, the protection portion covers the protected portion. The protected portion has an edge which is located at an edge of the protection portion in the front-rear direction or is apart from the protection portion in the front-rear direction. The pressed portion is pressed to be moved downward in accompany with a connection of the connector with a card. When the pressed portion is moved downward, the edge of the protected portion is located within the receiving portion without contact with the protection portion.

16 Claims, 14 Drawing Sheets

CONNECTOR

CROSS REFERENCE TO RELATED APPLICATIONS:

An applicant claims priority under 35 U.S.C. §119 of Japanese Patent Application No. JP2014-247320 filed Dec. 5, 2014.

BACKGROUND OF THE INVENTION:

This invention relates to a connector which is to be connected with a card such as a Subscriber Identity Module (SIM) card.

For example, this type of connector is disclosed in JP-B 4733610 (Patent Document 1), the content of which is incorporated herein by reference.

Referring to FIG. 27, the connector 900 disclosed in Patent Document 1 comprises a base member 910 (holding member) and a contact terminal 920 (contact). The base member is formed with recesses 912 and shoulder portions 914. The shoulder portions 914 cover the recesses 912 from above, respectively. The contact terminal 920 has an end formed with a movable end portion 922. The contact terminal 920 also has an opposite end (not shown) held by the base member 910 so that the movable end portion 922 is movable. The movable end portion 922 is formed with engagement portions 924. When the movable end portion 922 is moved upward, the engagement portions 924 are engaged with the shoulder portions 914, respectively. This engagement prevents the movable end portion 922 from being moved beyond a bottom surface 910B of the base member 910. The thus-arranged contact terminal 920 is prevented from being buckled when a card (not shown) is inserted into the connector 900. Otherwise, the contact terminal 920 might be buckled because of an abutment of the movable end portion 922 with the card.

Referring to FIG. 27, the movable end portion 922 might be bent upon in accompany with the insertion of the card (not shown) so that edges 926 of the engagement portions 924 are brought into abutment with the shoulder portions 914, respectively. If the edges 926 are brought into abutment with the shoulder portions 914, resilience of the spring of the contact terminal 920 becomes lower. The edges 926 supported by the spring with such low resilience might damage the shoulder portions 914. Moreover, if the connector 900 receives an impact due to dropping, etc. under a state where the edges 926 are stuck in the shoulder portions 914, the contact terminal 920 might be damaged.

SUMMARY OF THE INVENTION:

It is therefore an object of the present invention to provide a connector comprising a contact and a holding member, wherein the contact and the holding member can be more securely prevented from being damaged.

One aspect of the present invention provides a connector connectable with a card by moving the card rearward in a front-rear direction. The connector comprises a contact and a holding member. The contact has a held portion, a pressed portion and a protected portion. The holding member includes a plate having a plate shape. The plate has a holding portion, a protection portion and a receiving portion. The holding portion holds the held portion. The protection portion and the receiving portion are arranged in the front-rear direction. The protection portion is located above the protected portion in an upper-lower direction perpendicular to the front-rear direction. The protected portion has a predetermined portion and an edge. When seen along the upper-lower direction, the protection portion covers the predetermined portion. The edge of the protected portion is located at a position same as that of the predetermined portion in a lateral direction perpendicular to both the front-rear direction and the upper-lower direction. The edge of the protected portion is located at an edge of the protection portion in the front-rear direction or is apart from the protection portion in the front-rear direction. The pressed portion is pressed to be moved downward in accompany with a connection of the connector with the card. When the pressed portion is moved downward, the edge of the protected portion is located within the receiving portion without being brought into contact with the protection portion.

According to the present invention, the held portion of the contact is held by the holding portion, and the protected portion of the contact is located below the protection portion. As a result, even if the connector receives an impact, the protected portion is stopped by the protection portion so that the contact is prevented from being plastically deformed. Moreover, when the connector is connected with the card, the edge of the protected portion is located within the receiving portion without being brought into contact with the protection portion. As a result, when the connector is connected with the card, the spring of the contact can keep its resilience so that the protection portion and the contact can be prevented from being damaged.

An appreciation of the objectives of the present invention and a more complete understanding of its structure may be had by studying the following description of the preferred embodiment and by referring to the accompanying drawings.

Figure 1:
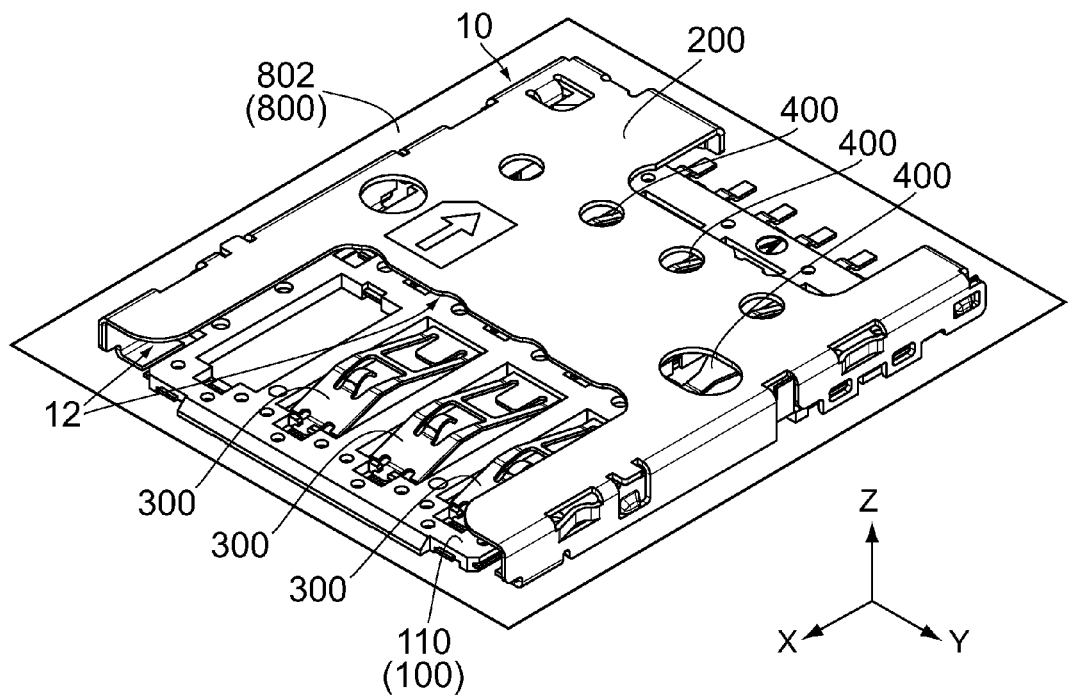
FIG. 1 is a perspective view showing a connector according to a first embodiment of the present invention, wherein a part of a mounting surface of a circuit board is illustrated.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS:

First Embodiment

Figure 8:
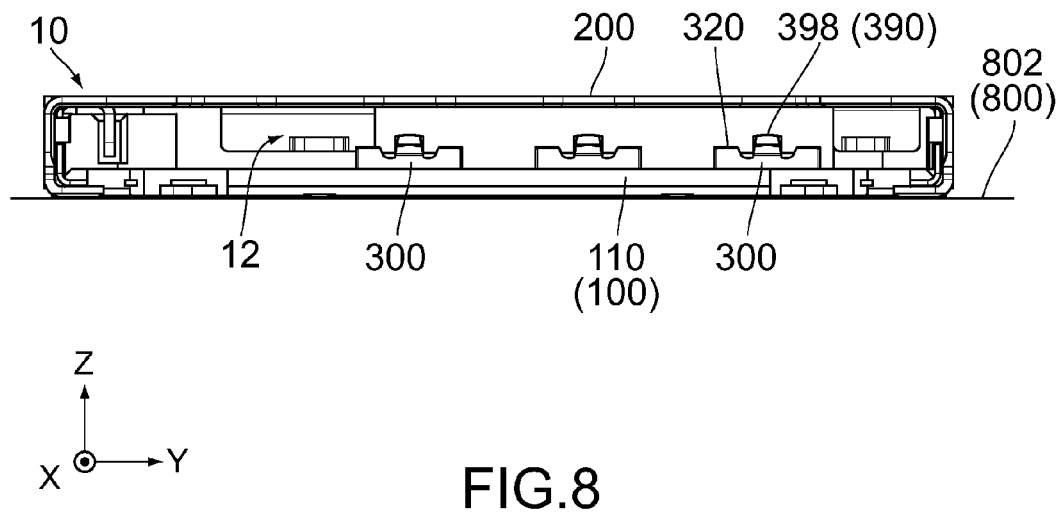
FIG. 8 is a front view showing the connector of FIG. 1, wherein a part of the mounting surface of the circuit board is illustrated.
Figure 9:
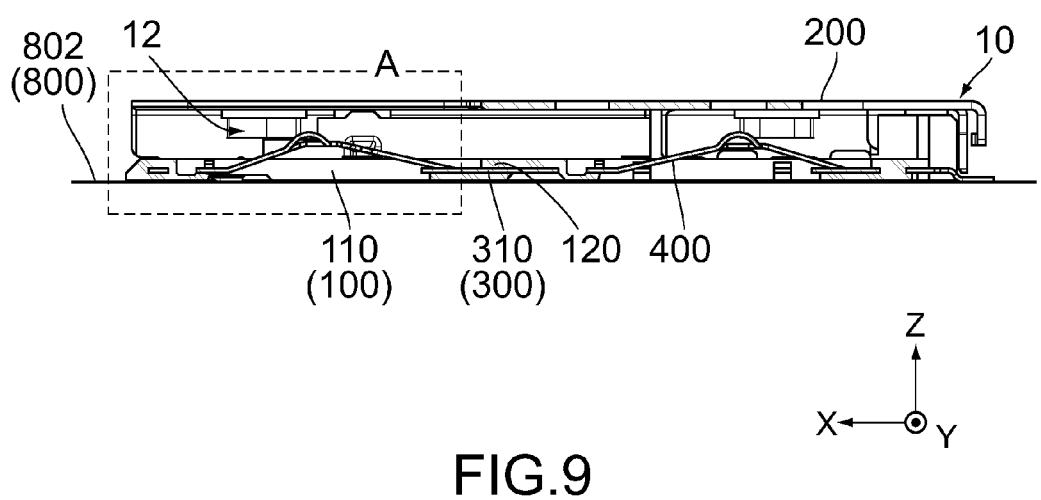
FIG. 9 is a cross-sectional view showing the connector of FIG. 7, taken along line IX-IX, wherein a part of the mounting surface of the circuit board is illustrated.
Figure 10:
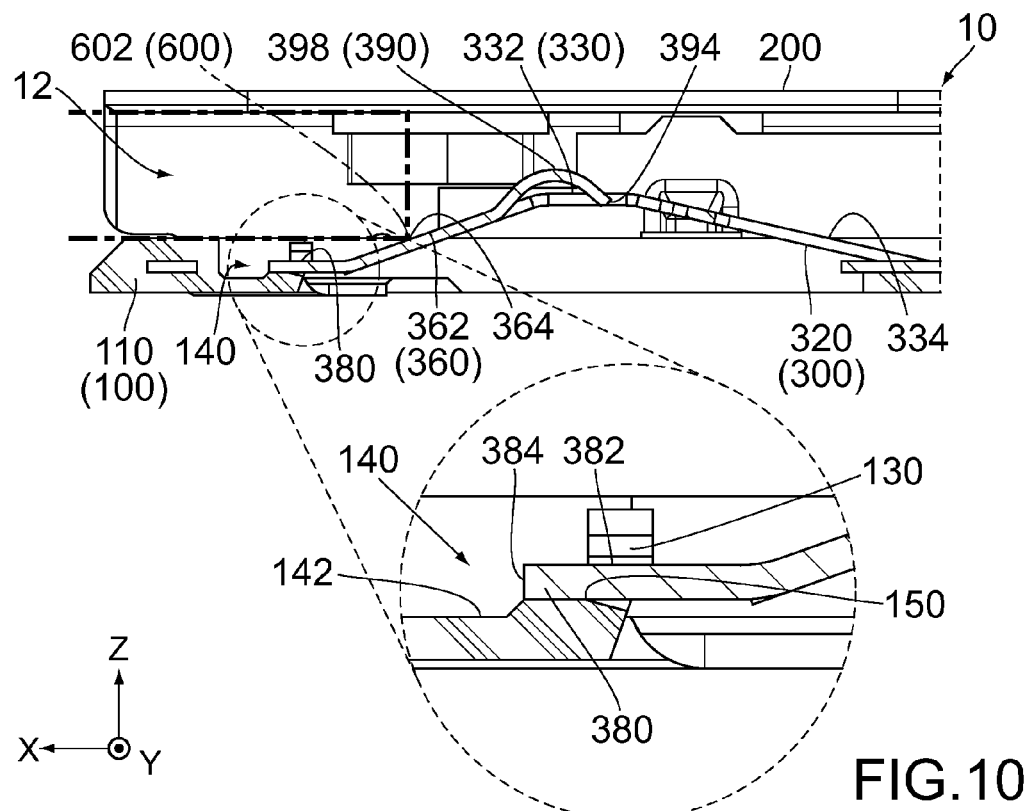
FIG. 10 is a cross-sectional view showing a part of the connector (the part enclosed by dashed line A) of FIG. 9, wherein a part of the card is illustrated by chain dotted line, and a vicinity of the protected portion of the contact (the part enclosed by dashed line) is enlarged to be illustrated.

Referring to FIGS. 1 and 10, a connector 10 according to a first embodiment of the present invention is connectable with a card 600 by moving the card 600 rearward, or in the negative X-direction, in a front-rear direction (X-direction). In the present embodiment, the card 600 is insertable into the connector 10 along the negative X-direction (insertion direction) and is removable from the connector 10 along the positive X-direction (removal direction). Referring to FIGS. 1, 8 and 9, the connector 10 according to the present embodiment is mounted on a mounting surface 802 of a circuit board 800 when used. However, the present invention is not limited thereto. For example, the connector 10 may be a so-called drop-in connector.

Figure 2:
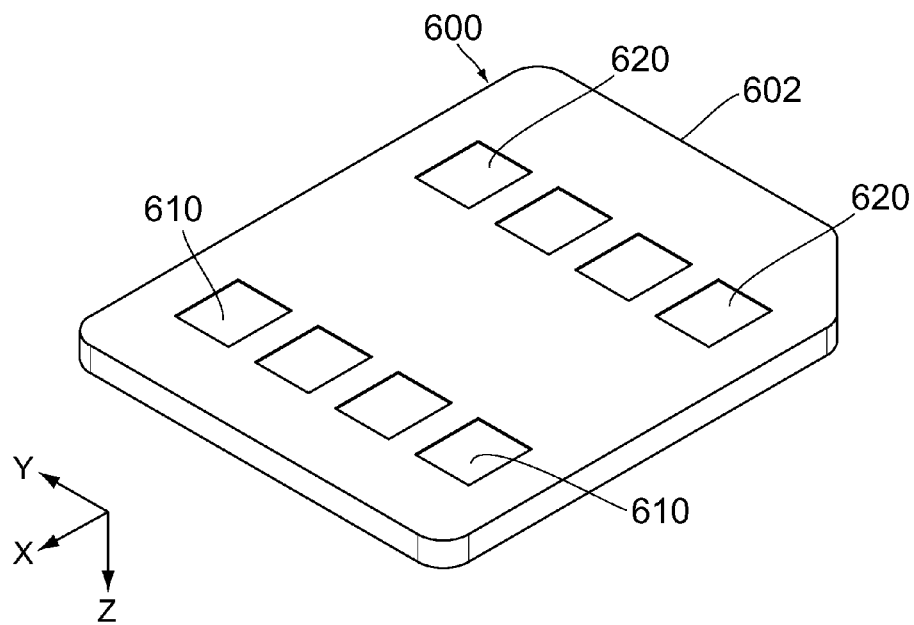
FIG. 2 is a perspective view showing a card connectable with the connector of FIG. 1.

Referring to FIG. 2, the card 600 is a micro SIM card which has four electrodes 610 and four electrodes 620. The electrodes 610 and the electrodes 620 are formed on a rear surface, or the negative Z-side surface, of the card 600. The electrodes 610 are located at a rear side, or the positive X-side, of the card 600 and arranged in a lateral direction (the Y-direction). The electrodes 620 are located at a front side, or the negative X-side, of the card 600 and arranged in the Y-direction. As described later, when the card 600 is inserted into the connector 10 (see FIG. 1), a leading end 602 of the card 600 works as a pressing portion 602.

Figure 3:
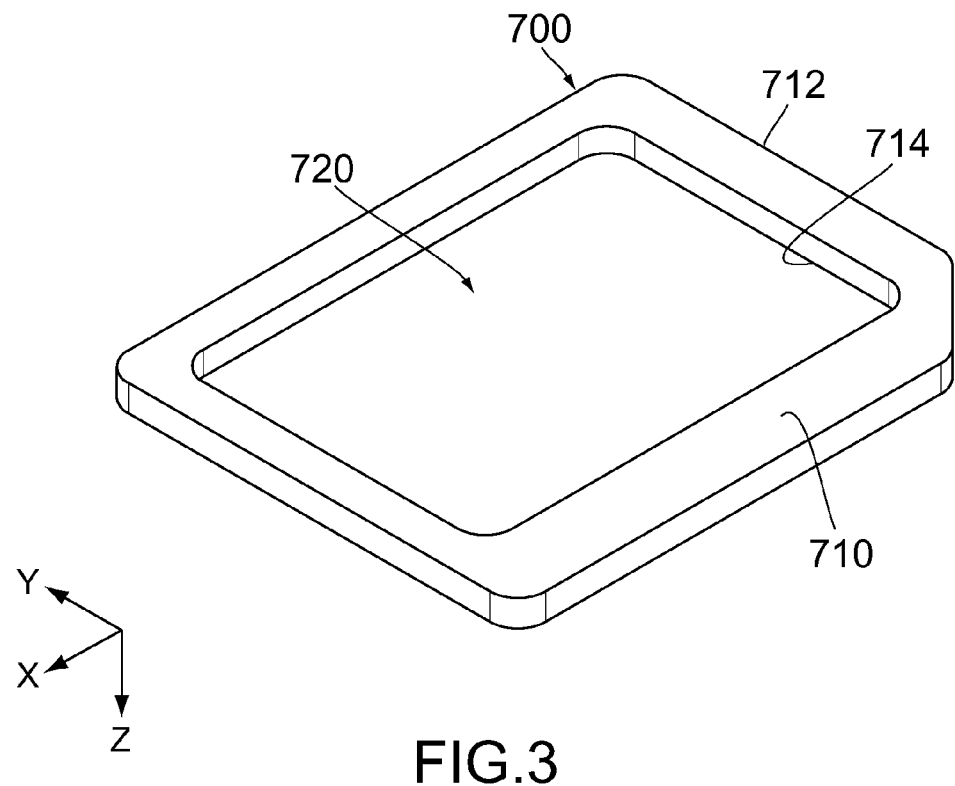
FIG. 3 is a perspective view showing a card adapter which has an outer shape same as that of the card of FIG. 2, and to which another card connectable with the connector of FIG. 1 is attachable.

Referring to FIGS. 1 to 3, the connector 10 is connectable not only to the card 600 but also to a nano SIM card (not shown) attached to a card adapter 700. The card adapter 700 is formed of a frame body 710 which surrounds a space 720. The frame body 710 has an external shape same as that of the card 600, and the space 720 corresponds to an external shape of the nano SIM card. When the card adapter 700 is inserted into the connector 10 together with the nano SIM card attached within the space 720, the nano SIM card can be connected with the connector 10. As described later, a leading end 712 of the frame body 710 works as a pressing portion 712 similar to the leading end 602 of the card 600. In addition, an inner wall 714 of the frame body 710 also works as a pressing portion 714.

Figure 5:
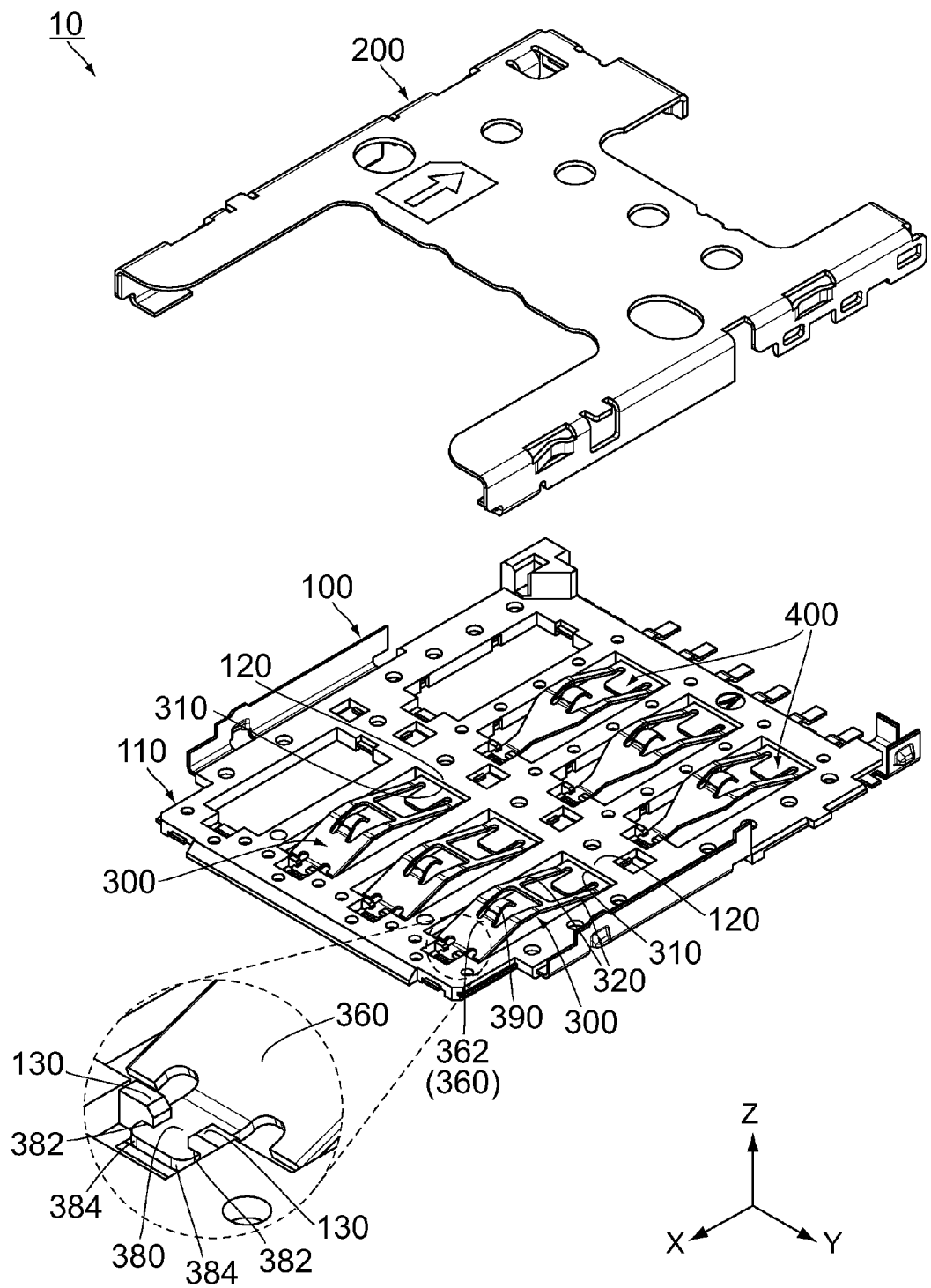
FIG. 5 is an exploded, perspective view showing the connector of FIG. 1, wherein the contact is attached to a holding member of the connector, and a vicinity of a protected portion of the contact (the part enclosed by dashed line) is enlarged to be illustrated.
Figure 6:
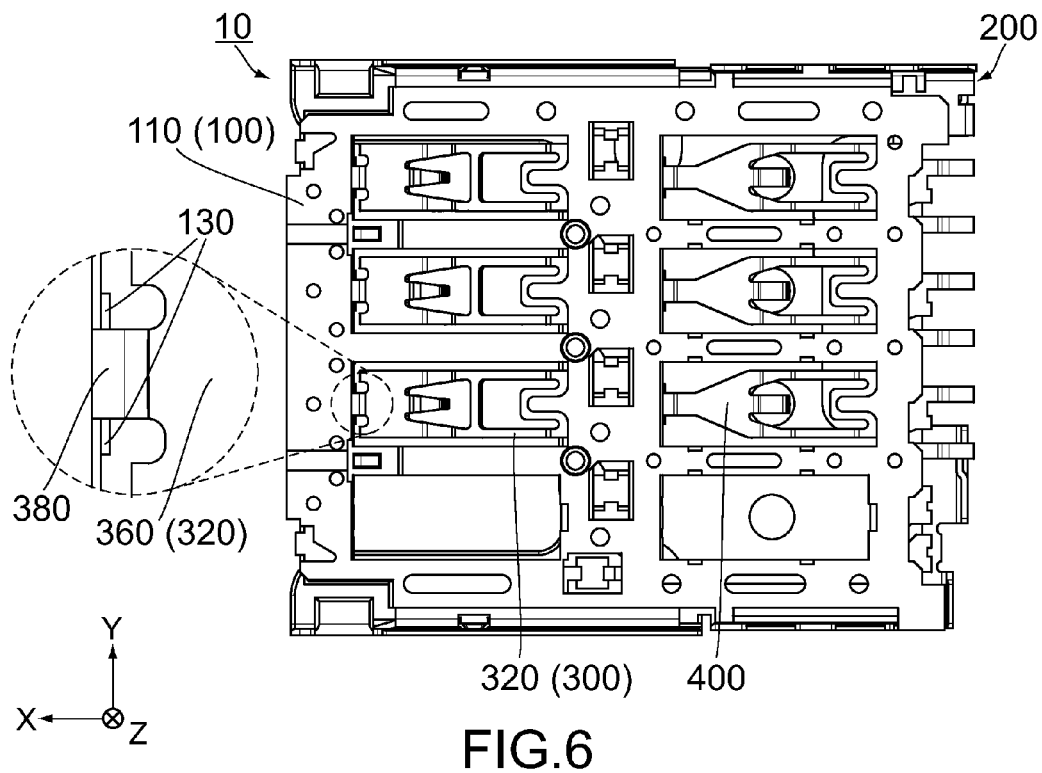
FIG. 6 is a bottom view showing the connector of FIG. 1, wherein a vicinity of the protected portion of the contact (the part enclosed by dashed line) is enlarged to be illustrated.

As shown in FIG. 5, the connector 10 according to the present embodiment comprises a holding member 100 mainly made of insulating material, a shell 200 made of metal, three front contacts (contacts) 300 each made of metal and three rear contacts 400 each made of metal. The contacts 300 are located at a front side, or the positive X-side, of the connector 10 and arranged in the Y-direction. The rear contacts 400 are located at a rear side, or the negative X-side, of the connector 10 and arranged in the Y-direction.

Figure 12:
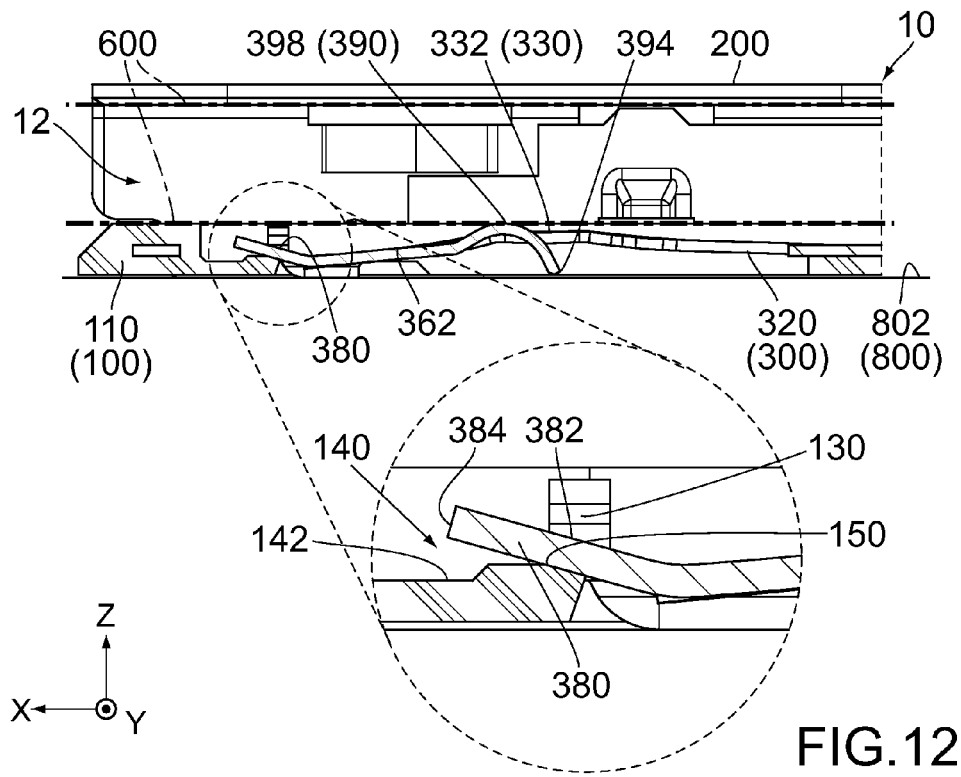
FIG. 12 is a cross-sectional view showing a part of the connector (the part enclosed by dashed line A) of FIG. 9, wherein the contact is resiliently deformed, a part of the card is illustrated by chain dotted line, a part of the mounting surface of the circuit board is illustrated by continuous line, and a vicinity of the protected portion of the contact (the part enclosed by dashed line) is enlarged to be illustrated.

Referring to FIGS. 1, 5, 8 and 9, the shell 200 is attached to the holding member 100 from above in an upper-lower direction (the Z-direction) and forms an accommodation portion 12 together with the holding member 100. Referring to FIG. 12, the accommodation portion 12 is a space for accommodating, at least in part, the card 600 connected with the connector 10. The accommodation portion 12 is located between the holding member 100 and the shell 200 in the Z-direction while being located between a front end (the positive X-side end) and a rear end (the negative X-side end) of the shell 200 in the X-direction.

Figure 4:
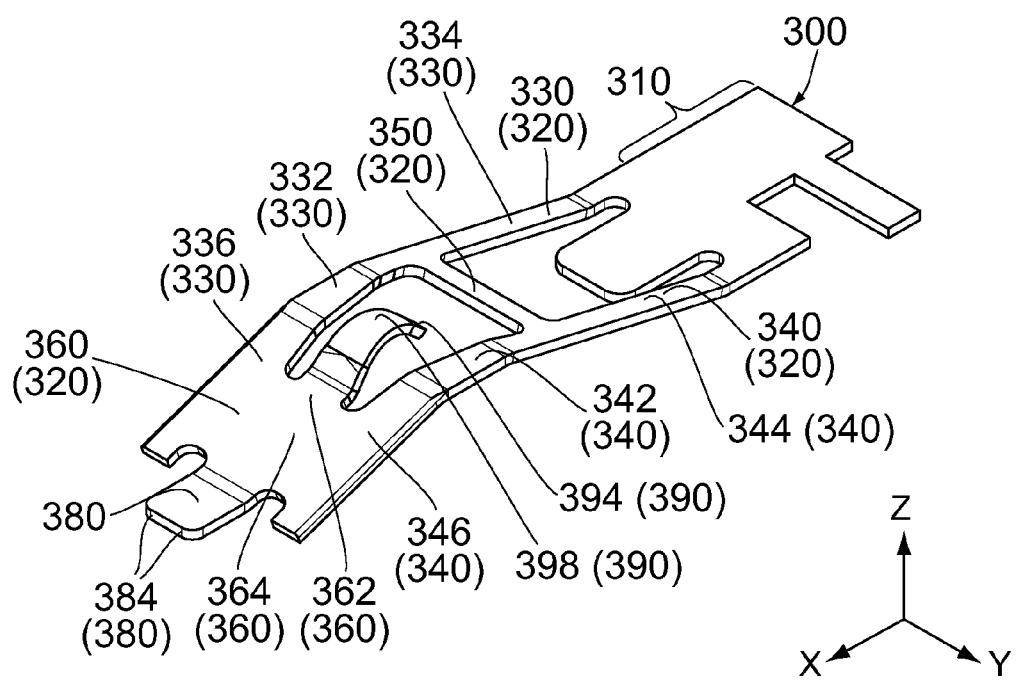
FIG. 4 is a perspective view showing a contact of the connector of FIG. 1.

As shown in FIGS. 4 and 5, each of the contacts 300 has a held portion 310, a first spring portion 320, a protected portion (movable end portion) 380 and a second spring portion 390. The held portion 310 is held by the holding member 100. The first spring portion 320 extends forward, or in the positive X-direction, from the held portion 310. The protected portion 380 extends forward from the first spring portion 320. The second spring portion 390 extends rearward from a middle part of the first spring portion 320 in the Y-direction.

As shown in FIG. 4, the first spring portion 320 has a first beam 330, a second beam 340, a coupling portion 350 and a connection end 360. The first beam 330 and the second beam 340 extend in parallel to each other. In detail, each of the first beam 330 and the second beam 340 extends in the X-direction while having a mountain-like projection formed at a middle part thereof in the X-direction. The coupling portion 350 couples the first beam 330 and the second beam 340 to each other in the Y-direction.

Figure 11:
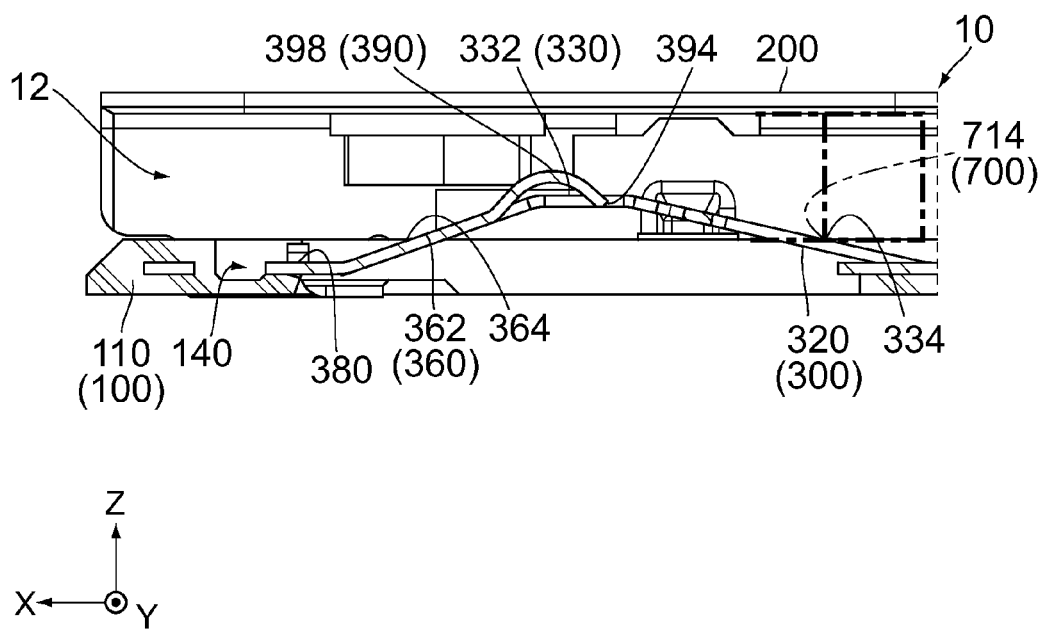
FIG. 11 is a cross-sectional view showing a part of the connector (the part enclosed by dashed line A) of FIG. 9, wherein a part of the card adapter to which the card is not attached is illustrated by chain dotted line.

Referring to FIGS. 4, 10 and 11, the first beam 330 has an upper surface 332, a first pressed portion (pressed portion) 334 and an end portion 336. The upper surface 332 is located at an upper end, or the positive Z-side end, of the first beam 330. The end portion 336 is located at a front end of the first beam 330. The first beam 330 has a rear part which extends upward and forward under an initial state where neither the card 600 nor the card adapter 700 presses the contact 300. The pressed portion 334 is a part of this rear part.

The second beam 340 has a structure similar to that of the first beam 330. In detail, the second beam 340 has an upper surface 342, a second pressed portion (pressed portion) 344 and an end portion 346. The upper surface 342 is located at an upper end of the second beam 340. The end portion 346 is located at a front end of the second beam 340. The second beam 340 has a rear part which extends upward and forward under the initial state. The pressed portion 344 is a part of this rear part.

As shown in FIG. 4, the connection end 360 couples the end portion 336 of the first beam 330 and the end portion 346 of the second beam 340 to each other. The connection end 360 has a start point 362 and a third pressed portion (pressed portion) 364. The start point 362 is located at a rear end of the connection end 360 in the X-direction and is located at a middle part of the connection end 360 in the Y-direction. Referring to FIG. 10, the connection end 360 extends upward and rearward under the initial state.

Referring to FIGS. 4 and 5, the first spring portion 320 extends from a front end of the held portion 310 to a rear end of the movable end portion 380. The movable end portion 380 extends forward from a front end of the first spring portion 320, and more specifically, from a front end of the connection end 360. The movable end portion 380 is not fixed to the holding member 100. The first spring portion 320, or each of the first beam 330 and the second beam 340, is therefore resiliently deformable downward, or in the negative Z-direction. The movable end portion 380 is movable relative to the holding member 100 upon (in accompany with) the resilient deformation of the first spring portion 320. In other words, the contact 300 has the movable end portion 380 which is movable.

As described above, the contact 300 has the first pressed portion 334, the second pressed portion 344 and the third pressed portion 364 each of which works as a pressed portion as described later. In other words, the first spring portion 320 has these three pressed portions which include the first pressed portion 334, the second pressed portion 344 and the third pressed portion 364. The first pressed portion 334 is a part of the first beam 330. The second pressed portion 344 is a part of the second beam 340. The third pressed portion 364 is a part of the connection end 360. In addition, the first spring portion 320 has the start point 362. The start point 362 is a part of the connection end 360.

As shown in FIGS. 4 and 5, the second spring portion 390 extends rearward from the start point 362. The second spring portion 390 has a rear end (free end) 394 and a contact point 398. The second spring portion 390 is coupled to the first spring portion 320 at the start point 362 and is resiliently deformable in the Z-direction. The rear end 394 is therefore movable relative to the start point 362 in the Z-direction. In other words, the second spring portion 390 has the rear end 394 as its free end.

Referring to FIGS. 4 and 10, when seen along the Y-direction, the free end 394 is located below the upper surface 332 of the first beam 330 and the upper surface 342 of the second beam 340. The contact point 398 is the part that is to be electrically connected with the card 600 or the nano SIM card (not shown). The contact point 398 is located between the free end 394 and the start point 362 in the X-direction and is located between the first beam 330 and the second beam 340 in the Y-direction.

Referring to FIG. 5, the holding member 100 includes a plate 110 made of insulating material and various metal members. The plate 110 has a plate shape. The plate 110 has a plurality of holding portions 120 which correspond to the contacts 300, respectively. The holding portions 120 hold the held portions 310 of the contacts 300, respectively. According to the present embodiment, the contacts 300 are embedded in the plate 110 via insert-molding so that the held portions 310 are securely fixed to the holding portions 120, respectively. However, the present invention is not limited thereto. For example, the held portions 310 may be press-fit into, fixed to and held by the holding portions 120, respectively.

Referring to FIGS. 5 to 7 and 10, the plate 110 has sets which correspond to the contacts 300, respectively, and each of which includes a protection portion 130, which is formed of two parts apart from each other in the Y-direction, and a receiving portion 140. The protection portion 130 is a part of the plate 110 and is located below the accommodation portion 12. The receiving portion 140 is a space located below the accommodation portion 12. The protection portion 130 and the receiving portion 140 are arranged in the X-direction. In the present embodiment, the receiving portion 140 is located forward of the protection portion 130.

Figure 7:
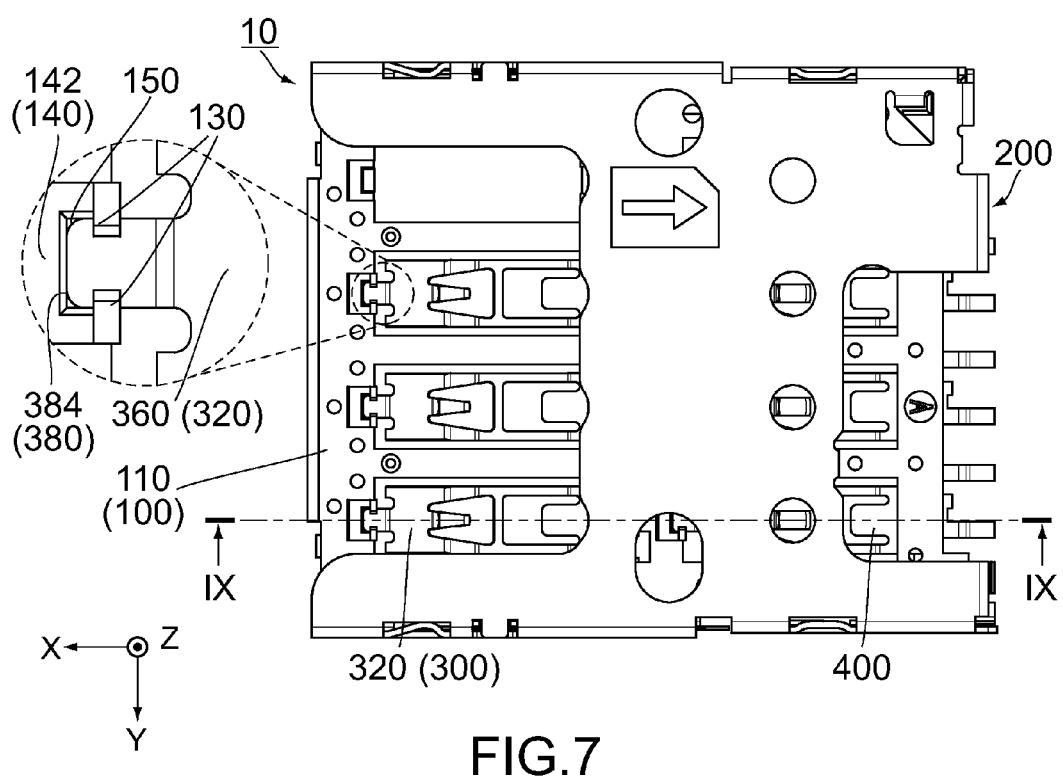
FIG. 7 is a top view showing the connector of FIG. 1, wherein a vicinity of the protected portion of the contact (the part enclosed by dashed line) is enlarged to be illustrated.

Referring to FIGS. 5, 7 and 10, the protection portion 130 is located above the protected portion 380 of the contact 300 in the Z-direction. When seen along the Z-direction, the protection portion 130 partially covers the protected portion 380. In detail, the protected portion 380 has a predetermined portion 382 which is formed of two parts apart from each other in the Y-direction. The predetermined portion 382 is just (completely) covered by the protection portion 130 when seen along the Z-direction. In other words, when an image of the protection portion 130 is projected on the protected portion 380 along the Z-direction, this image of the protection portion 130 is equal to the predetermined portion 382. In addition, the protected portion 380 has an edge 384 which is formed of two parts apart from each other in the Y-direction and is located at a position same as that of the predetermined portion 382 in the Y-direction. The edge 384 according to the present embodiment is apart from the protection portion 130 in the X-direction. The protection portion 130 therefore does not cover the edge 384 under the initial state when seen along the Z-direction. However, the present invention is not limited thereto. For example, the edge 384 under the initial state may be located at an edge (front edge) of the protection portion 130 in the X-direction.

According to the present embodiment, even if the connector 10 receives an impact, the protected portion 380 is stopped by the protection portion 130 so that the contact 300 can be prevented from being largely deformed or being damaged because of plastic deformation. For example, even when the connector 10 falls, the contact 300 can be prevented from being bent upward to be plastically deformed. Moreover, according to the present embodiment, the protected portion 380 is sandwiched between two sidewalls in the Y-direction. This structure further securely prevents the damage of the contact 300.

Referring to FIGS. 7 and 10, the connector 10 comprises stopping portions 150 corresponding to the contacts 300, respectively. The stopping portion 150 according to the present embodiment is a part of the plate 110. The stopping portion 150 is located below the protected portion 380. The protection portion 130 and the stopping portion 150 vertically sandwich the protected portion 380 therebetween in the Z-direction to regulate a movement of the protected portion 380 in the Z-direction. This structure further securely prevents the damage of the contact 300.

The receiving portion 140 according to the present embodiment has a bottom surface 142. The bottom surface 142 is a part of the plate 110. The stopping portion 150 and the bottom surface 142 are arranged in the X-direction.

Referring to FIGS. 10 and 12, when the card 600 (i.e. a connection object) or the card adapter 700 (i.e. another connection object: see FIG. 3) is inserted into the connector 10, the pressing portion 602 or the pressing portion 712 (see FIGS. 2 and 3) is brought into abutment with the pressed portion 364 of the contact 300. The first spring portion 320 receives a downward force applied to the pressed portion 364 and is therefore resiliently deformed. This deformation causes the pressed portion 364 to be moved downward. In other words, the pressed portion 364 is pressed to be moved downward upon (in accompany with) a connection of the connector 10 with the connection object.

The protected portion 380, which is located at a front end of the contact 300, is arranged under the protection portion 130. This arrangement prevents the first spring portion 320 from being buckled when the connection object is inserted. In other words, the contact 300 is prevented from being damaged. Moreover, referring to FIGS. 10 and 12 as well as FIG. 4, both the end portion 336 of the first beam 330 and the end portion 346 of the second beam 340 are connected to the connection end 360. This structure prevents the first spring portion 320 from being buckled even if the connection object is inserted along a direction oblique to the X-direction.

Referring to FIGS. 10 and 12, when the pressed portion 364 is moved downward, the movable end portion 380 is stopped by the stopping portion 150 in the Z-direction and is moved toward the bottom surface 142 of the receiving portion 140 from the stopping portion 150 in the X-direction. In the meantime, the edge 384 of the protected portion 380 is moved forward and upward within the receiving portion 140 without being brought into contact with the protection portion 130. In other words, when the pressed portion 364 is moved downward, the edge 384 is located within the receiving portion 140 without being brought into contact with the protection portion 130. Since the edge 384 is not brought into abutment with the protection portion 130 as described above, the protection portion 130 can be prevented from being damaged. According to the present embodiment, not only the damage of the contact 300 but also the damage of the holding member 100 can be prevented.

In the present embodiment, the bottom surface 142 of the receiving portion 140 is located below the stopping portion 150 in the Z-direction. The edge 384 can be therefore smoothly moved forward with no friction against the bottom surface 142. However, the present invention is not limited thereto. For example, in a case where the edge 384 is mainly moved upward, the bottom surface 142 may be located at a position same as that of the stopping portion 150 in the Z-direction or may be located slightly above the stopping portion 150.

In the present embodiment, the position of the protection portion 130 in the X-direction is not equal to, but overlaps, the position of the stopping portion 150 in the X-direction. This arrangement allows the protection portion 130 to have a large size in the X-direction and therefore enables the protected portion 380 to be more securely protected. However, the present invention is not limited thereto. For example, the whole of the protection portion 130 may be located at a position same as that of the stopping portion 150 in the X-direction. Thus, the protection portion 130 may be located, at least in part, at a position same as that of the stopping portion 150 in the X-direction. However, for example, in a case where the connector 10 substantially has no restriction in its size in the X-direction, the protection portion 130 may be apart from the stopping portion 150 in the X-direction.

In the present embodiment, the receiving portion 140 opens upward to communicate with the accommodation portion 12. However, the present invention is not limited thereto. For example, the receiving portion 140 may be separated from the accommodation portion 12 with a separation wall (not shown).

Referring to FIG. 11, the card adapter 700 might be inserted into the connector 10 without the attachment of the nano SIM card (not shown). When the thus-inserted card adapter 700 is forced to be removed from the connector 10 along the positive X-direction, the pressing portion 714 of the card adapter 700 is brought into abutment with the pressed portion 334 and the pressed portion 344 (see FIG. 4). As a result, the first spring portion 320 is resiliently deformed similar to the first spring portion 320 during the insertion of the connection object into the connector 10. In detail, the pressed portion 334 and the pressed portion 344 are moved downward, and the movable end portion 380 is therefore moved forward. Moreover, the edge 384 is located within the receiving portion 140 without being brought into contact with the protection portion 130. According to the present embodiment, even when the card adapter 700 is removed after improper insertion as described above, the contact 300 and the holding member 100 can be prevented from being damaged.

When the pressed portion 334 and the pressed portion 344 (see FIG. 4) are moved downward, the start point 362 of the first spring portion 320 and the free end 394 of the second spring portion 390 are moved downward. When the pressing portion 714 of the card adapter 700, which is moved in the positive X-direction, arrives in the vicinity of the free end 394, the free end 394 is located below the pressing portion 714 and is not brought into contact with the card adapter 700. Therefore, the second spring portion 390 also can be prevented from being buckled and damaged.

According to the present embodiment, the free end 394 under the initial state is located below a predetermined plane, or a plane defined by the upper surface 332 of the first beam 330 and the upper surface 342 of the second beam 340 (see FIG. 4). This structure enables the second spring portion 390 to be more securely prevented from being buckled. However, the present invention is not limited thereto. The free end 394 under the initial state may be located above the predetermined plane, provided that the card adapter 700 is not brought into contact with the free end 394.

As can be seen from the above explanation, according to the present embodiment, the free end 394 under the initial state can be located high, and the contact point 398 under the initial state can be therefore located high. The moving distance of the thus-located contact point 398 can be made larger. The contact point 398 according to the present embodiment is brought into contact with the electrode 610 (see FIG. 2) with a sufficient contact force when the card 600 is inserted into the connector 10.

As described below, the present embodiment can be variously modified in addition to the already explained modifications.

Referring to FIGS. 5 and 7, the protection portion 130 according to the present embodiment does not cover the middle part of the protected portion 380 in the Y-direction. In other words, the predetermined portion 382 according to the present embodiment is formed of two parts which are located at opposite sides of the protected portion 380 in the Y-direction, respectively. In addition, the protection portion 130 according to the present embodiment is not in contact with the predetermined portion 382 under the initial state. However, the present invention is not limited thereto. For example, the protection portion 130 may cover the whole of the protected portion 380 from above. In other words, the whole of the protected portion 380 may be the predetermined portion. Moreover, the protection portion 130 may be further apart from and above the protected portion 380 under the initial state or otherwise may be in contact with the predetermined portion 382 under the initial state, provided that the contact 300 can be prevented from being damaged.

Referring to FIG. 10, the protected portion 380, or the movable end portion 380 in the present embodiment, is in contact with the stopping portion 150 under the initial state. However, the present invention is not limited thereto. For example, the movable end portion 380 under the initial state may be apart from and above the stopping portion 150.

Referring to FIGS. 10 and 12, the movable end portion 380 according to the present embodiment is located at the front end of the contact 300 and is moved forward during the downward movement of the pressed portion of the contact 300. However, the present invention is not limited thereto. For example, the contact 300 may be held by the plate 110 in a reverse arrangement in the front-rear direction. In this case, the movable end portion 380 is located at a rear end of the contact 300 and is moved rearward during the downward movement of the pressed portion. The effect similar to that of the present embodiment can be obtained by this arrangement.

Referring to FIG. 5, each of the rear contacts 400 according to the present embodiment works similar to the contact 300. More specifically, each of the rear contacts 400 has a protected portion which is protected similar to the protected portion 380 of the contact 300. However, the present invention is not limited thereto. For example, the rear contact 400 may have a structure different from that of the contact 300. Moreover, the connector 10 does not always need to include the rear contacts 400.

The connector 10 does not always need to include the shell 200. In an example in which the shell 200 is not provided, the connector 10 may form an accommodation portion (not shown) together with an electronic apparatus (not shown) when attached to the electronic apparatus.

The present invention is more variously applicable in addition to the present embodiment and modifications described above.

Second Embodiment

Figure 13:
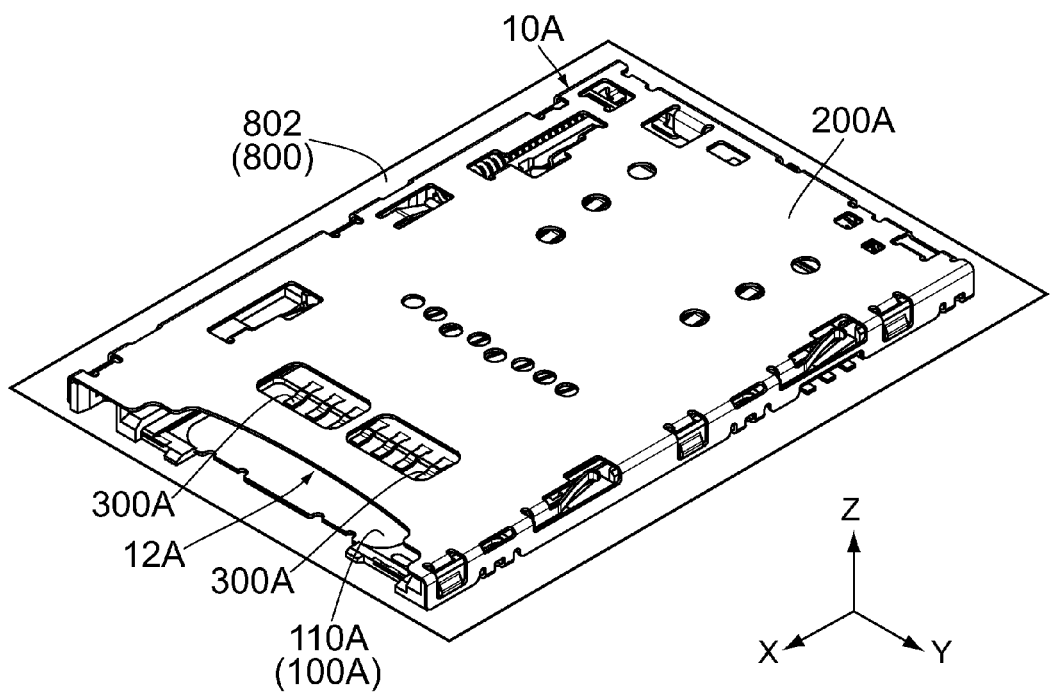
FIG. 13 is a perspective view showing a connector according to a second embodiment of the present invention, wherein a part of a mounting surface of a circuit board is illustrated.

Referring to FIG. 13, a connector 10A according to a second embodiment of the present invention is connectable with a card (not shown) different from the card 600 (see FIG. 2) in a manner similar to that of the connector 10 (see FIG. 1). The connector 10A according to the present embodiment is mounted on the mounting surface 802 of the circuit board 800 similar to the connector 10 when used. Hereafter, explanation will be made about the connector 10A, in particular, mainly about differences between the connector 10A and the connector 10.

Figure 14:
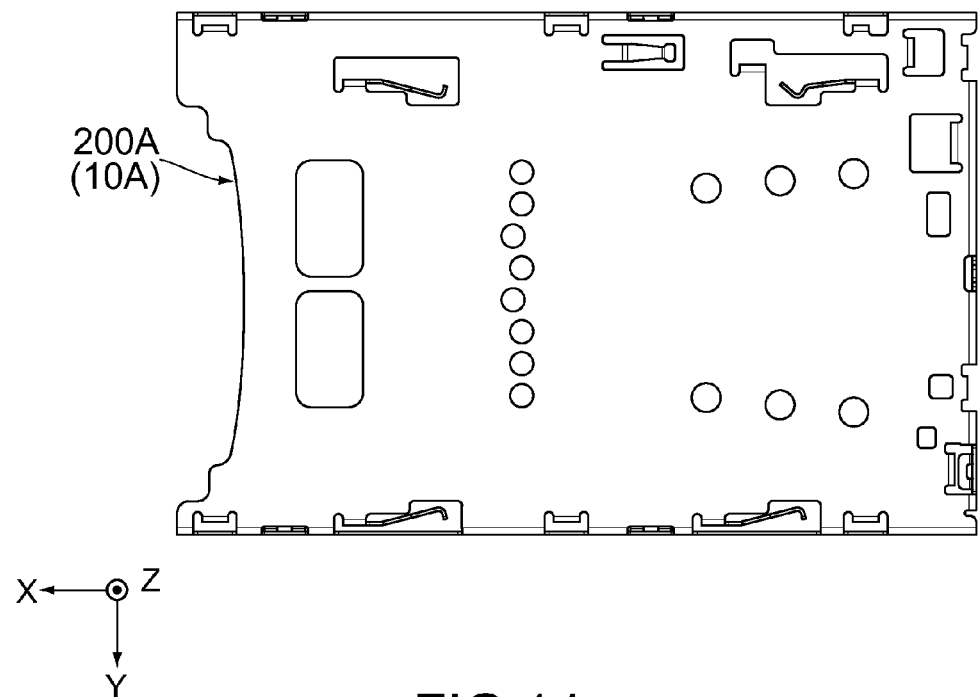
FIG. 14 is a top view showing a shell of the connector of FIG. 13.
Figure 15:
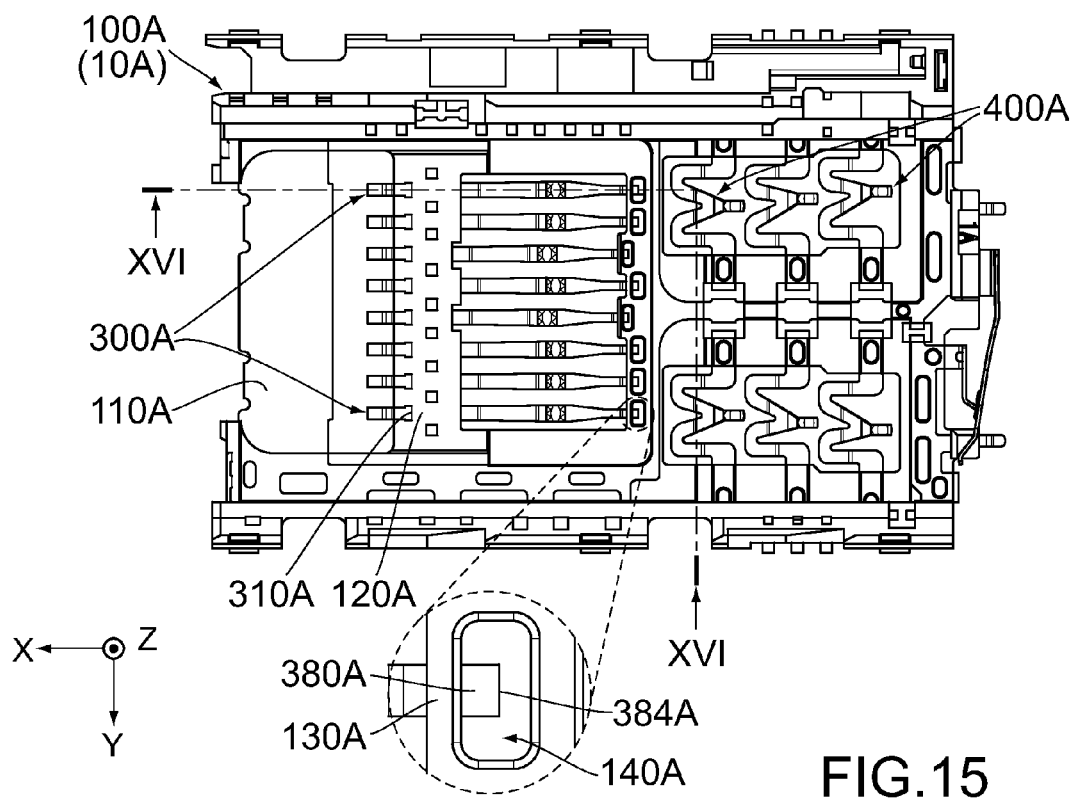
FIG. 15 is a top view showing a holding member of the connector of FIG. 13, wherein contacts are attached to the holding member, and a vicinity of a protected portion of the contact (the part enclosed by dashed line) is enlarged to be illustrated.

Referring to FIGS. 13 to 15, the connector 10A according to the present embodiment comprises a holding member 100A mainly made of insulating material, a shell 200A made of metal, a plurality of front contacts (contacts) 300A each made of metal and a plurality of rear contacts 400A each made of metal. The shell 200A is attached to the holding member 100A from above in an upper-lower direction (the Z-direction) and forms an accommodation portion 12A together with the holding member 100A. The accommodation portion 12A accommodates, at least in part, the card (not shown) connected with the connector 10A. The contacts 300A are located forward of the rear contacts 400A in a front-rear direction (X-direction) and are arranged in the Y-direction (lateral direction).

Figure 16:
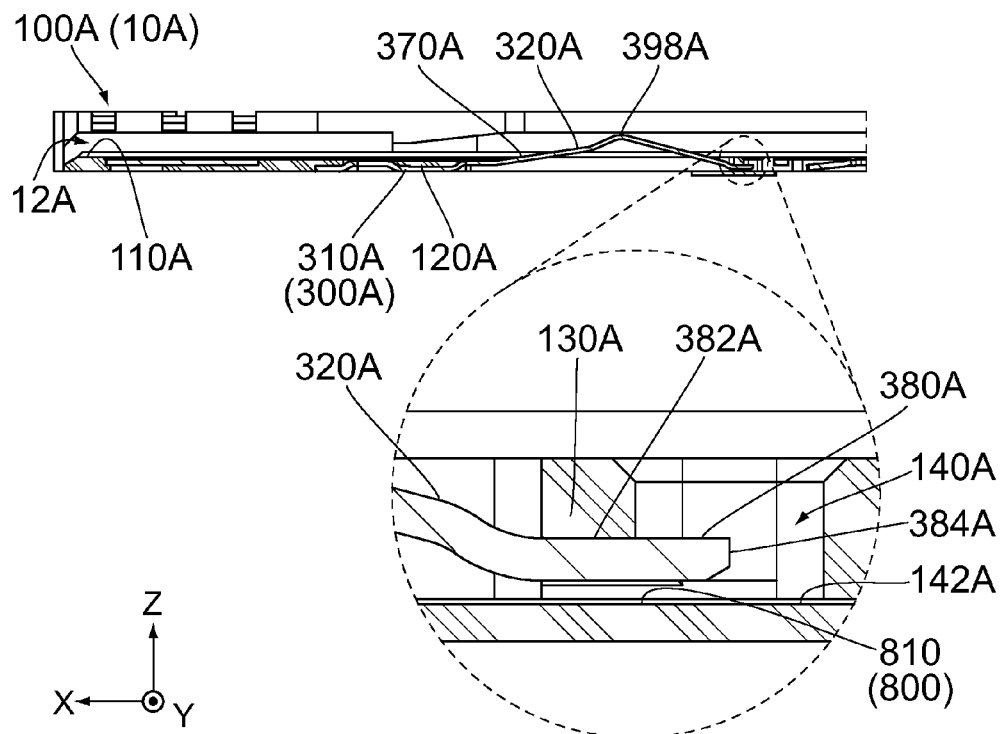
FIG. 16 is a cross-sectional view showing the holding member of FIG. 15, taken along line XVI-XVI, wherein a vicinity of the protected portion of the contact (the part enclosed by dashed line) is enlarged to be illustrated.

As shown in FIGS. 15 and 16, each of the contacts 300A has a held portion 310A, a spring portion 320A, a pressed portion 370A, a protected portion (movable end portion) 380A and a contact point 398A.

The held portion 310A is fixed to and held by the holding member 100A. The spring portion 320A extends rearward from the held portion 310A. The protected portion 380A extends rearward from the spring portion 320A. In the present embodiment, the movable end portion is the protected portion 380A. The spring portion 320A has a front part, or a slope, which extends upward and rearward under an initial state where the card (not shown) does not press the contact 300A. The pressed portion 370A is a part of this slope. The contact point 398A is located at an upper end of the spring portion 320A.

The movable end portion 380A is not fixed to the holding member 100A. The movable end portion 380A is movable relative to the holding member 100A upon (in accompany with) a resilient deformation of the spring portion 320A. In other words, the contact 300A has the movable end portion 380A which is movable.

Referring to FIGS. 15 and 16, the holding member 100A includes a plate 110A made of insulating material. The plate 110A has a plate shape. The plate 110A has sets which correspond to the contacts 300A, respectively, and each of which includes a holding portion 120A, a protection portion 130A and a receiving portion 140A.

The holding portion 120A holds the held portion 310A of the corresponding contact 300A. The protection portion 130A is located below the accommodation portion 12A in the Z-direction. The receiving portion 140A is a space located below the accommodation portion 12A. The protection portion 130A and the receiving portion 140A are arranged in the X-direction. In the present embodiment, the receiving portion 140A is located rearward of the protection portion 130A.

The protection portion 130A is located above the protected portion 380A of the contact 300A in the Z-direction. The thus-located protected portion 380A has a predetermined portion 382A that is just (completely) covered by the protection portion 130A when seen along the Z-direction. In other words, when an image of the protection portion 130A is projected on the protected portion 380A along the Z-direction, this image of the protection portion 130A is equal to the predetermined portion 382A. In addition, the protected portion 380A has an edge 384A which is located at a position same as that of the predetermined portion 382A in the Y-direction. The edge 384A according to the present embodiment is apart from the protection portion 130A in the X-direction. The protection portion 130A therefore does not cover the edge 384A when seen along the Z-direction.

According to the present embodiment, similar to the first embodiment (see FIGS. 10 and 12), the protected portion 380A of the contact 300A is protected from above by the protection portion 130A. Similar to the first embodiment, the contact 300A can be prevented from being damaged even in a case where an impact is applied to the connector 10A.

Figure 17:
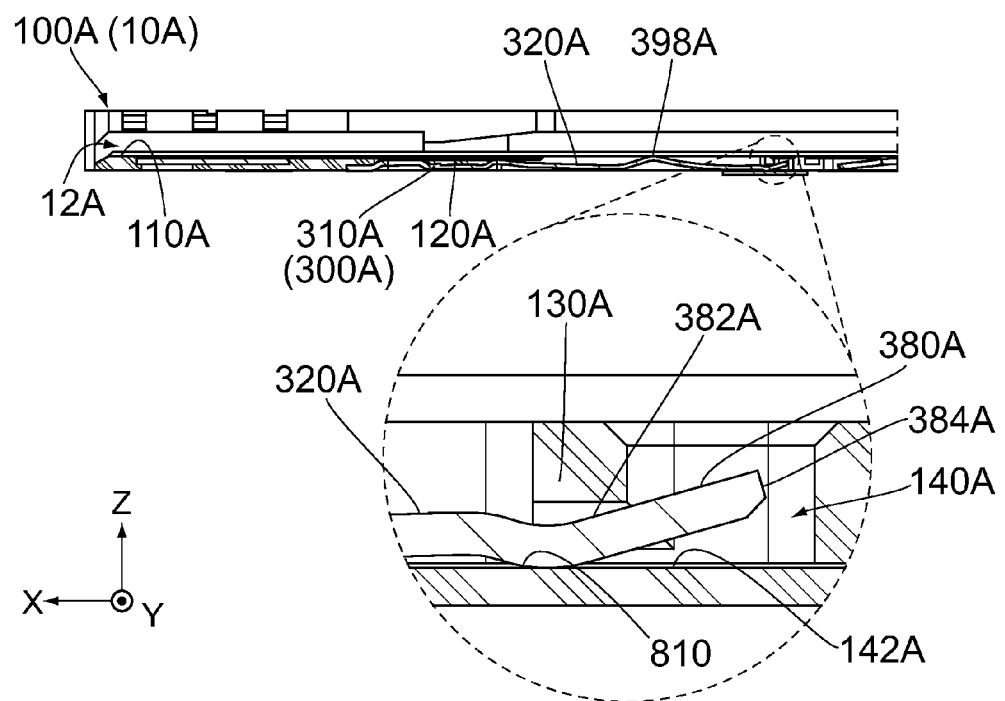
FIG. 17 is a cross-sectional view showing the holding member of FIG. 15, taken along line XVI-XVI, wherein the contact is resiliently deformed, and a vicinity of the protected portion of the contact (the part enclosed by dashed line) is enlarged to be illustrated.

Referring to FIGS. 16 and 17, the circuit board 800, on which the connector 10A is mounted when used, has a part which works as a stopping portion 810. In addition, the circuit board 800 has another part which works as a bottom surface 142A of the receiving portion 140A. In other words, when the connector 10A is used, the connector 10A comprises the stopping portion 810, and the receiving portion 140A has the bottom surface 142A. The stopping portion 810 and the bottom surface 142A are arranged in the X-direction. The stopping portion 810 is apart from the protected portion 380A to be located below the protected portion 380A. The bottom surface 142A is located at a position same as that of the stopping portion 810 in the Z-direction. According to the present embodiment, a size of the plate 110A in the Z-direction can be made small. Moreover, a size of the protection portion 130A can be made relatively large.

When the card (not shown), which is a connection object, is inserted into the connector 10A, a pressing portion (not shown) of the card is brought into abutment with the pressed portion 370A of the contact 300A. The spring portion 320A is resiliently deformed downward, and the pressed portion 370A is therefore moved downward. In other words, the pressed portion 370A is pressed to be moved downward upon (in accompany with) the connection of the connector 10A with the card.

When the pressed portion 370A is moved downward, the movable end portion 380A is stopped by the stopping portion 810 in the Z-direction and is moved rearward, or toward the bottom surface 142A of the receiving portion 140A, from the stopping portion 810 in the X-direction. In the meantime, similar to the first embodiment (see FIG. 12), the edge 384A of the protected portion 380A is located within the receiving portion 140A without being brought into contact with the protection portion 130A. According to the present embodiment, similar to the first embodiment, not only the damage of the contact 300A but also the damage of the holding member 100A can be prevented.

Referring to FIG. 16, the protection portion 130A according to the present embodiment is in contact with the predetermined portion 382A under the initial state. However, the protection portion 130A may be no contact with and apart from the predetermined portion 382A under the initial state.

Referring to FIG. 15, each of the rear contacts 400A according to the present embodiment has a structure different from that of the contact 300A. However, the rear contact 400A may have a structure same as that of the contact 300A. Moreover, the connector 10A does not always need to include the rear contacts 400A.

Third Embodiment

Figure 18:
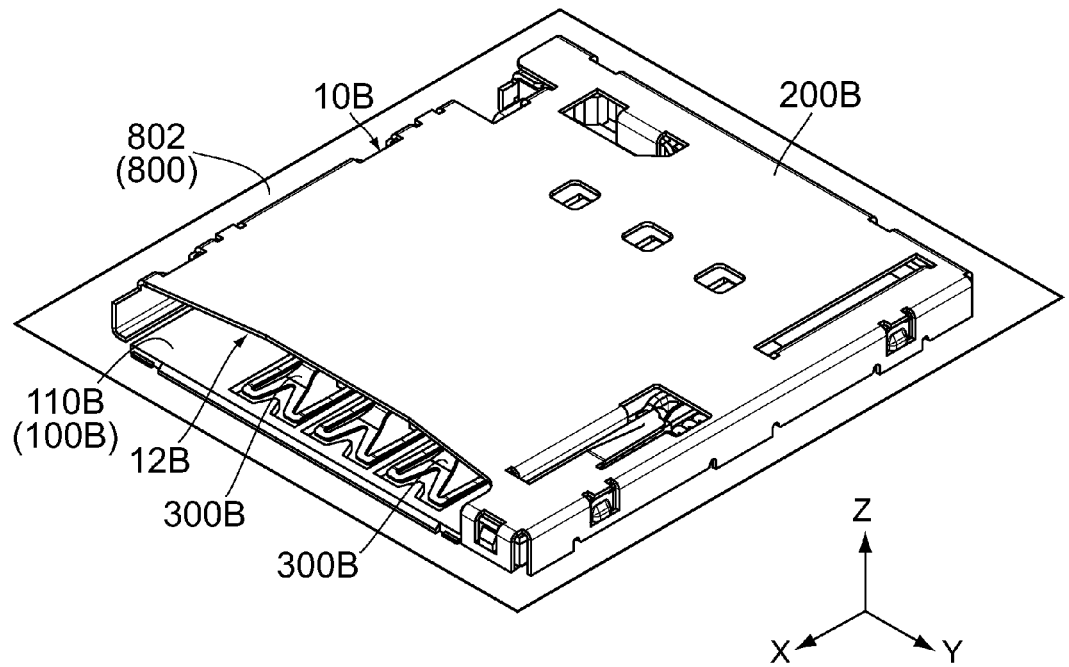
FIG. 18 is a perspective view showing a connector according to a third embodiment of the present invention, wherein a part of a mounting surface of a circuit board is illustrated.

Referring to FIG. 18, a connector 10B according to a third embodiment of the present invention is connectable similar to the connector 10 (see FIG. 1) with a card (not shown) similar to the card 600 (see FIG. 2). The connector 10B according to the present embodiment is mounted on the mounting surface 802 of the circuit board 800 similar to the connector 10 when used. Hereafter, explanation will be made about the connector 10B, in particular, mainly about differences between the connector 10B and the connector 10.

Figure 19:
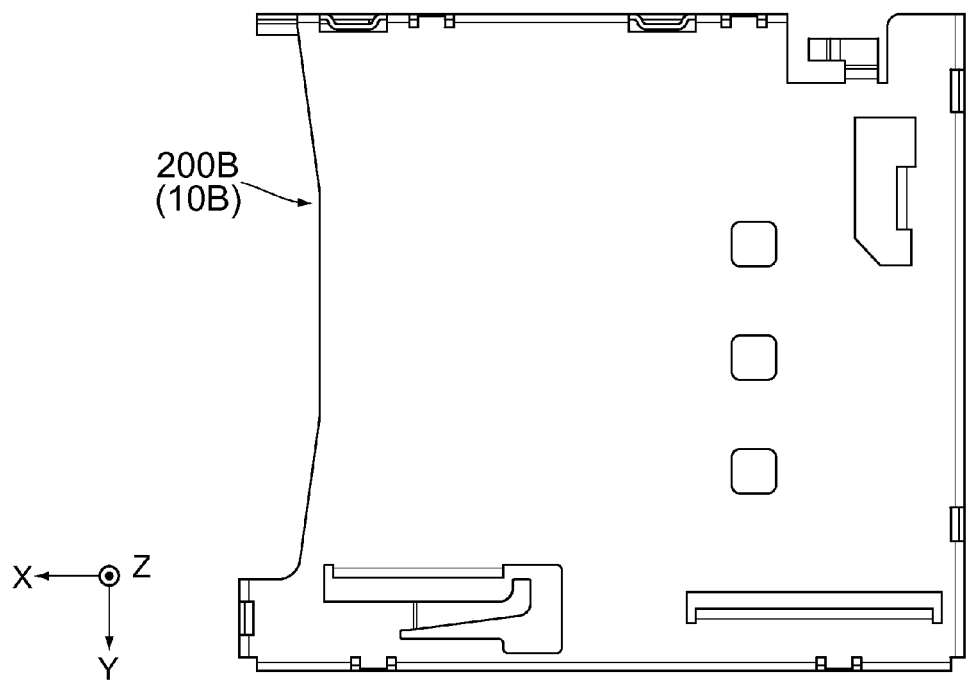
FIG. 19 is a top view showing a shell of the connector of FIG. 18.
Figure 20:
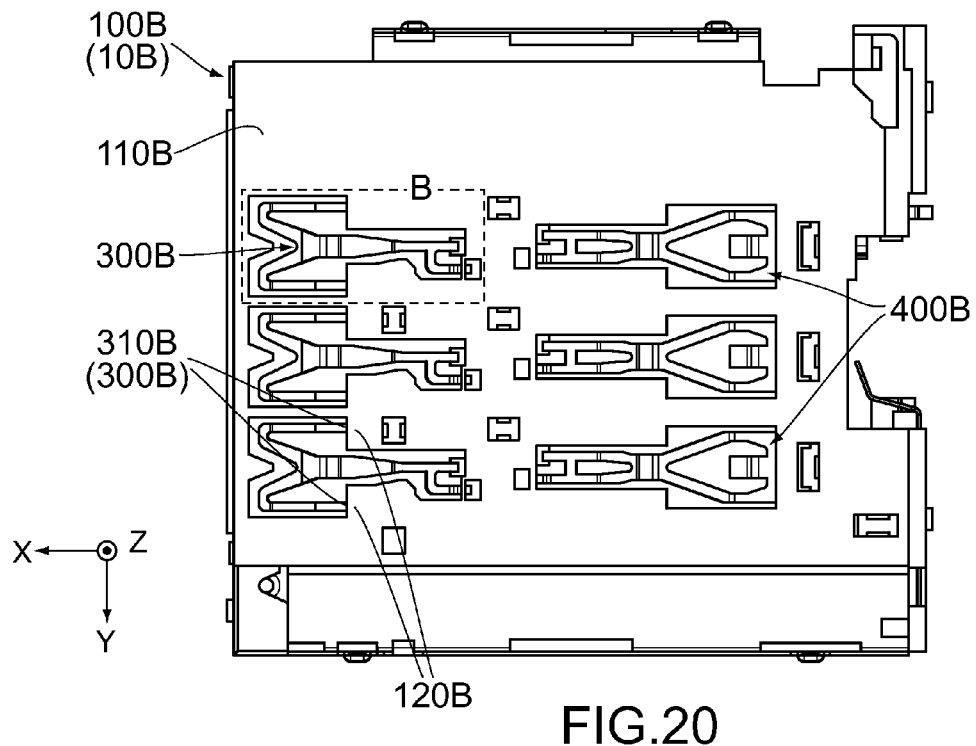
FIG. 20 is a top view showing a holding member of the connector of FIG. 18, wherein contacts are attached to the holding member.

Referring to FIGS. 18 to 20, the connector 10B according to the present embodiment comprises a holding member 100B mainly made of insulating material, a shell 200B made of metal, three front contacts (contacts) 300B each made of metal and three rear contacts 400B each made of metal. The shell 200B is attached to the holding member 100B from above in an upper-lower direction (the Z-direction) and forms an accommodation portion 12B together with the holding member 100B. The accommodation portion 12B accommodates, at least in part, the card (not shown) connected with the connector 10B. The contacts 300B are located forward of the rear contacts 400B in a front-rear direction (X-direction) and are arranged in the Y-direction (lateral direction).

Figure 21:
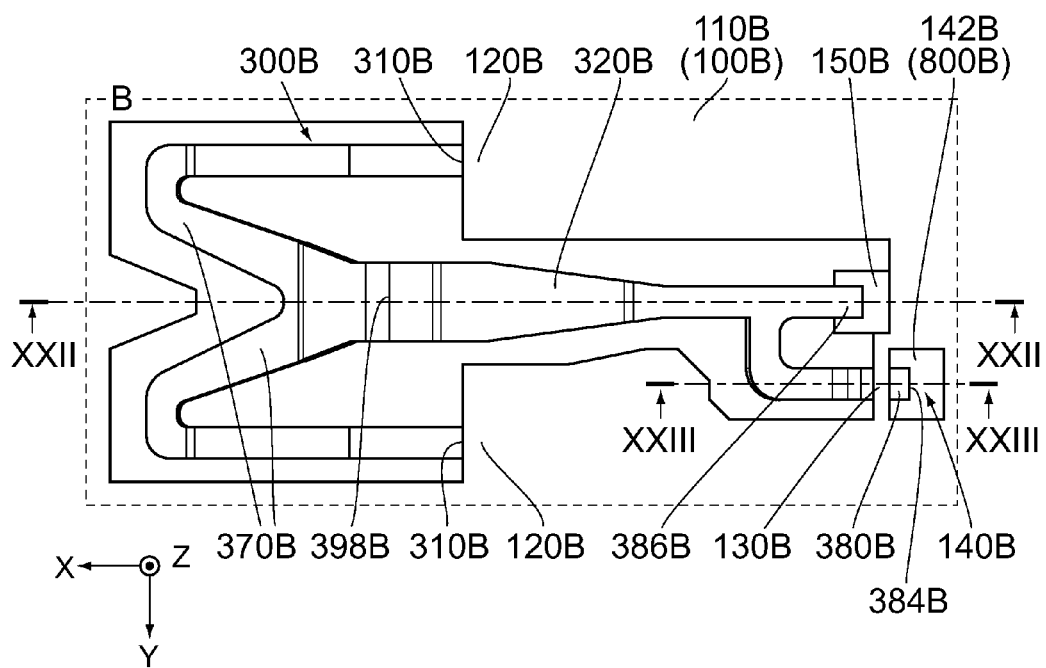
FIG. 21 is a top view showing the contact attached to the holding member (the part enclosed by dashed line B) of FIG. 20.
Figure 22:
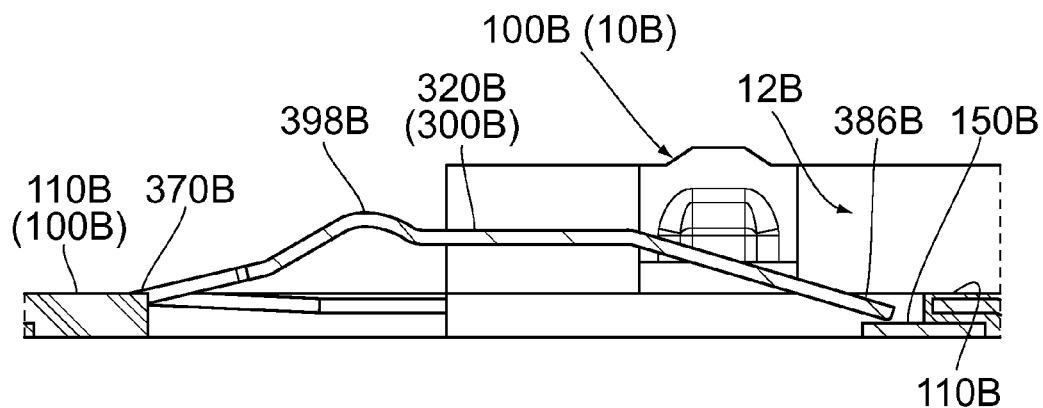
FIG. 22 is a cross-sectional view showing the holding member and the contact of FIG. 21, taken along line XXII-XXII.
Figure 23:
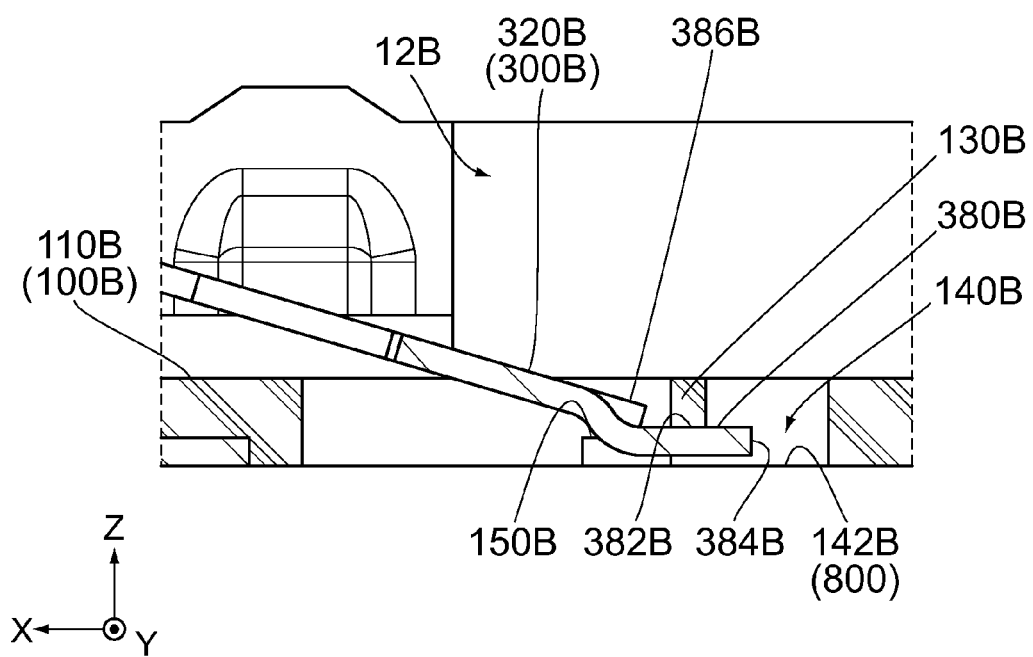
FIG. 23 is a cross-sectional view showing the holding member and the contact of FIG. 21, taken along line XXIII-XXIII.

As shown in FIGS. 21 to 23, each of the contacts 300B has two held portions 310B, a spring portion 320B, two pressed portions 370B, a protected portion 380B, a movable end portion 386B and a contact point 398B.

Each of the held portions 310B is fixed to and held by the holding member 100B. The spring portion 320B extends forward from the held portions 310B and subsequently extends rearward. The movable end portion 386B is a rear end portion of the spring portion 320B. The protected portion 380B branches from a front end of the movable end portion 386B and extends rearward. Accordingly, in the present embodiment, the movable end portion 386B is a part different from the protected portion 380B. The spring portion 320B has two slopes formed at its front part, wherein each of the slopes extends upward and rearward under an initial state where the card (not shown) does not press the contact 300B. The pressed portions 370B are the respective parts of these slopes. The contact point 398B is located at an upper end of the spring portion 320B.

Each of the protected portion 380B and the movable end portion 386B is not fixed to the holding member 100B. Each of the protected portion 380B and the movable end portion 386B is therefore movable relative to the holding member 100B upon (in accompany with) a resilient deformation of the spring portion 320B. In other words, the contact 300B has the protected portion 380B and the movable end portion 386B each of which is movable.

Referring to FIGS. 20 and 21, the holding member 100B includes a plate 110B made of insulating material. The plate 110B has a plate shape. The plate 110B has sets which correspond to the contacts 300B, respectively, and each of which includes two holding portions 120B, a protection portion 130B and a receiving portion 140B.

Referring to FIGS. 21 to 23, for each of the contacts 300B, the holding portions 120B hold the two held portions 310B, respectively. The protection portion 130B is located below the accommodation portion 12B in the Z-direction. The receiving portion 140B is a space located below the accommodation portion 12B. The protection portion 130B and receiving portion 140B are arranged in the X-direction. In the present embodiment, the receiving portion 140B is located rearward of the protection portion 130B.

The protection portion 130B is located above the protected portion 380B of the contact 300B in the Z-direction. The thus-located protected portion 380B has a predetermined portion 382B that is just (completely) covered by the protection portion 130B when seen along the Z-direction. In other words, when an image of the protection portion 130B is projected on the protected portion 380B along the Z-direction, this image of the protection portion 130B is equal to the predetermined portion 382B. In addition, the protected portion 380B has an edge 384B which is located at a position same as that of the predetermined portion 382B in the Y-direction. The edge 384B according to the present embodiment is apart from the protection portion 130B in the X-direction. The protection portion 130B therefore does not cover the edge 384B when seen along the Z-direction.

According to the present embodiment, similar to the first embodiment (see FIGS. 10 and 12), the protected portion 380B of the contact 300B is protected from above by the protection portion 130B. Similar to the first embodiment the first embodiment, the contact 300B can be prevented from being damaged even in a case where an impact is applied to the connector 10B.

Figure 25:
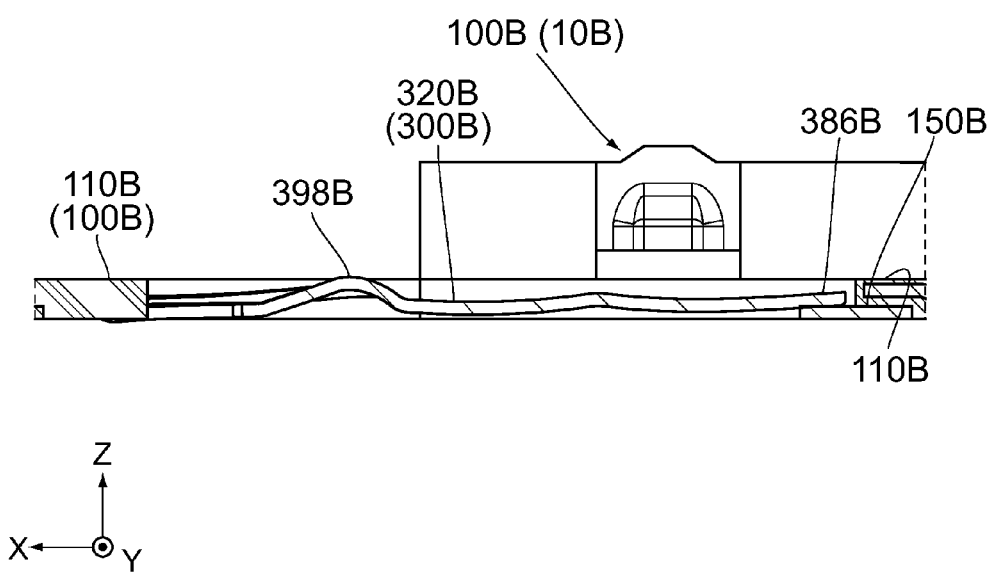
FIG. 25 is a cross-sectional view showing the holding member and the contact of FIG. 24, taken along line XXV-XXV.
Figure 26:
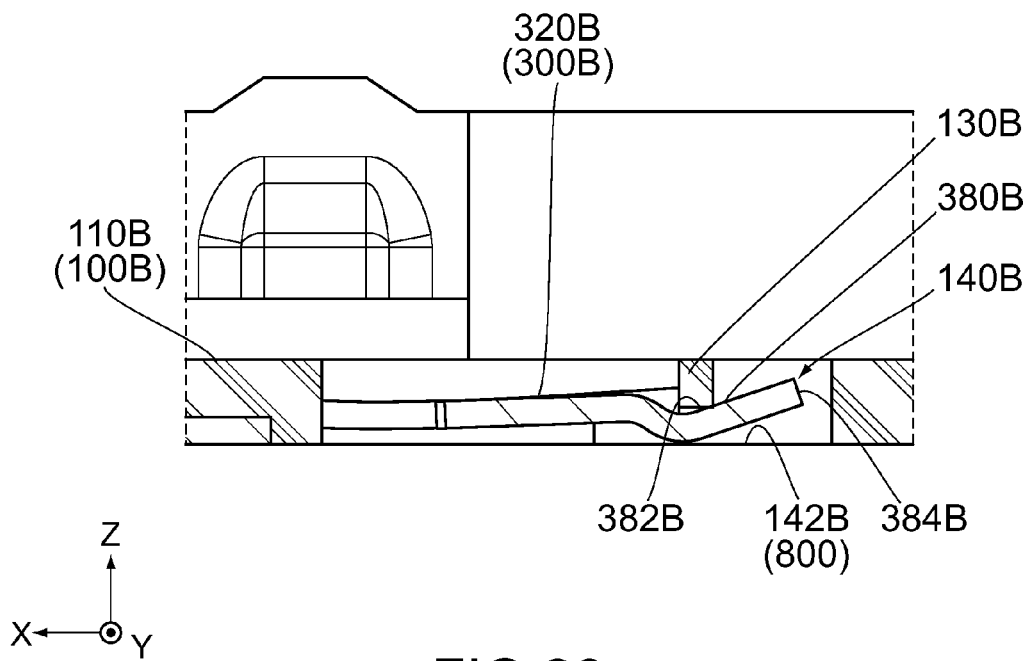
FIG. 26 is a cross-sectional view showing the holding member and the contact of FIG. 24, taken along line XXVI-XXVI.
Figure 27:
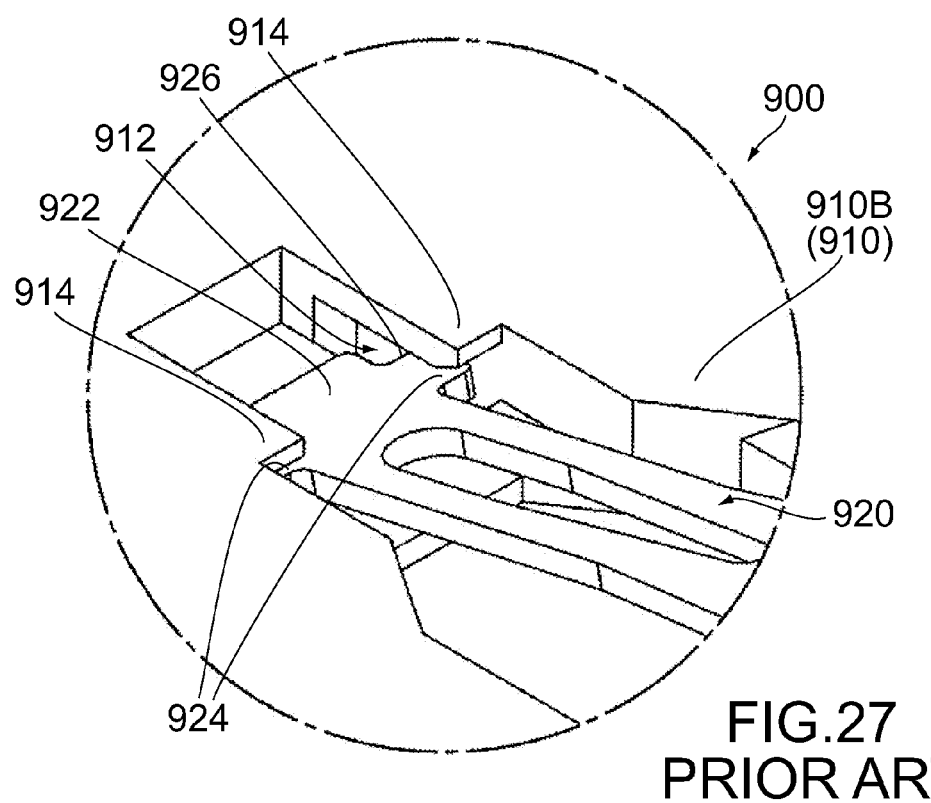
FIG. 27 is a perspective view showing a part of a connector of Patent Document 1.

Referring to FIGS. 22 and 25, the plate 110B is reinforced by the metal members embedded therein. These metal members include parts each of which works as a stopping portion 150B. In other words, the connector 10B comprises the stopping portion 150B. The stopping portion 150B according to the present embodiment is a part of the metal member installed to the plate 110B. The thus-installed metal member enables the stopping portion 150B to be thin. Referring to FIGS. 23 and 26, the circuit board 800, on which the connector 10B is mounted when used, has a part which works as a bottom surface 142B of the receiving portion 140B. In other words, the receiving portion 140B has the bottom surface 142B when the connector 10B is used.

Figure 24:
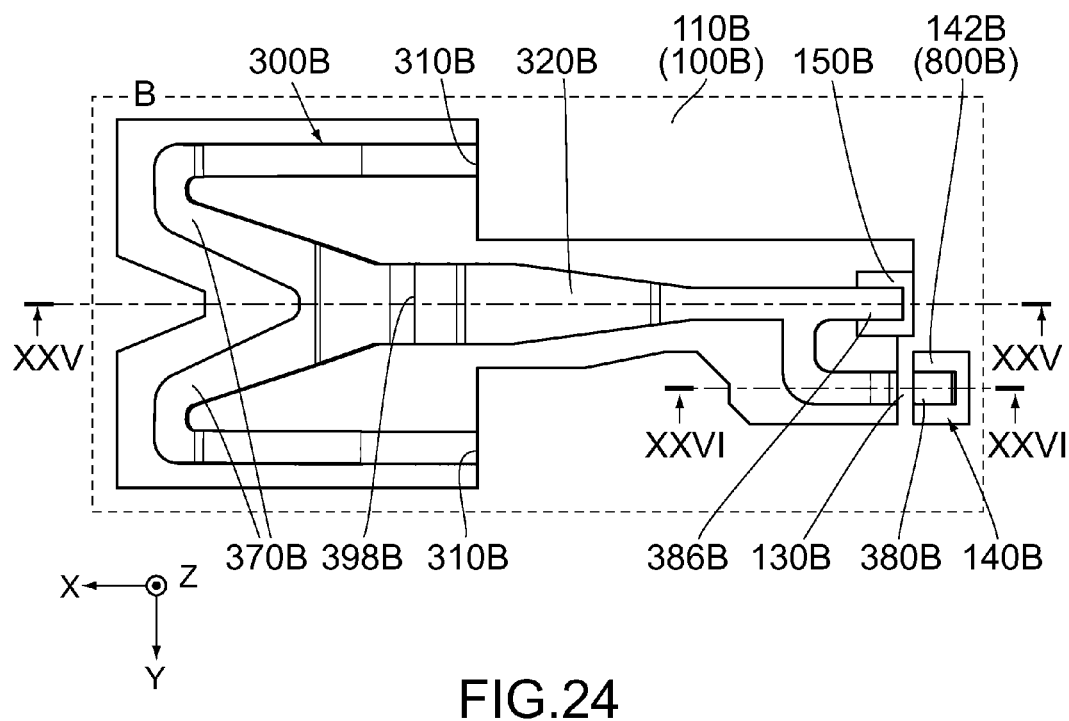
FIG. 24 is a top view showing the contact attached to the holding member (the part enclosed by dashed line B) of FIG. 20, wherein the contact is resiliently deformed.

As shown in FIGS. 21 and 24, the stopping portion 150B is formed so as to correspond to the movable end portion 386B, and the protection portion 130B is formed so as to correspond to the protected portion 380B. Accordingly, the stopping portion 150B and the protection portion 130B are separated from each other in the Y-direction. According to the present embodiment, a size of the plate 110B in the Z-direction can be reduced.

Referring to FIGS. 22 and 25, when the card (not shown), which is a connection object, is inserted into the connector 10B, a pressing portion (not shown) of the card is brought into abutment with the pressed portions 370B of the contact 300B. The spring portion 320B is resiliently deformed downward, and the pressed portions 370B are therefore moved downward. In other words, the pressed portions 370B are pressed to be moved downward upon (in accompany with) the connection of the connector 10B with the card.

Referring to FIGS. 22 and 25, when the pressed portions 370B are moved downward, the movable end portion 386B is stopped by the stopping portion 150B in the Z-direction and is moved rearward. Referring to FIGS. 23 and 26, in the meantime, the protected portion 380B is moved rearward as a whole without being brought into contact with the bottom surface 142B. Accordingly, similar to the first embodiment (see FIG. 12), the edge 384B of the protected portion 380B is located within the receiving portion 140B without being brought into contact with the protection portion 130B. According to the present embodiment, similar to the first embodiment, not only the damage of the contact 300B but also the damage of the holding member 100B can be prevented.

Referring to FIG. 23, the protection portion 130B according to the present embodiment is in contact with the predetermined portion 382B under the initial state.

However, the protection portion 130B may be not in contact with but apart from the predetermined portion 382B under the initial state.

Referring to FIG. 20, each of the rear contacts 400B according to the present embodiment has a structure similar to the contact 300B. However, the rear contact 400B may have a structure different from that of the contact 300B. Moreover, the connector 10B does not always need to include the rear contacts 400B.

The present application is based on a Japanese patent application of JP2014-247320 filed before the Japan Patent Office on Dec. 5, 2014, the content of which is incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector connectable with a card by moving the card rearward in a front-rear direction, wherein:
   the connector comprises a contact and a holding member;
   the contact has a held portion, a pressed portion and a protected portion;
   the holding member includes a plate having a plate shape;
   the plate has a holding portion, a protection portion and a receiving portion;
   the holding portion holds the held portion;
   the protection portion and the receiving portion are arranged in the front-rear direction;
   the protection portion is located above the protected portion in an upper-lower direction perpendicular to the front-rear direction;
   the protected portion has a predetermined portion and an edge;
   when seen along the upper-lower direction, the protection portion covers the predetermined portion;
   the edge of the protected portion is located at a position same as that of the predetermined portion in a lateral direction perpendicular to both the front-rear direction and the upper-lower direction;
   the edge of the protected portion is located at an edge of the protection portion in the front-rear direction or is apart from the protection portion in the front-rear direction;
   the pressed portion is pressed to be moved downward in accompany with a connection of the connector with the card; and
   when the pressed portion is moved downward, the edge of the protected portion is located within the receiving portion without being brought into contact with the protection portion.

2. The connector as recited in claim 1, wherein the protection portion does not cover the edge of the protected portion when seen along the upper-lower direction.

3. The connector as recited in claim 1, wherein:
the connector comprises a shell;
the shell is attached to the holding member and forms an accommodation portion together with the holding member;
the accommodation portion accommodates, at least in part, the card connected with the connector; and
the protection portion is located below the accommodation portion.

4. The connector as recited in claim 1, wherein:
the connector comprises a stopping portion;
the contact has a movable end portion which is movable; and
when the pressed portion is moved downward, the movable end portion is stopped by the stopping portion in the upper-lower direction.

5. The connector as recited in claim 4, wherein the stopping portion is a part of the plate.

6. The connector as recited in claim 4, wherein the stopping portion is a part of a metal member installed to the plate.

7. The connector as recited in claim 4, wherein when the pressed portion is moved downward, the movable end portion is stopped by the stopping portion in the upper-lower direction and is moved forward.

8. The connector as recited in claim 4, wherein when the pressed portion is moved downward, the movable end portion is stopped by the stopping portion in the upper-lower direction and is moved rearward.

9. The connector as recited in claim 4, wherein the movable end portion is the protected portion.

10. The connector as recited in claim 9, wherein the protection portion is located, at least in part, at a position same as that of the stopping portion in the front-rear direction.

11. The connector as recited in claim 9, wherein:
the receiving portion has a bottom surface;
the stopping portion and the bottom surface are arranged in the front-rear direction;
the bottom surface is located below the stopping portion; and
when the pressed portion is moved downward, the movable end portion is stopped by the stopping portion in the upper-lower direction and is moved toward the bottom surface from the stopping portion in the front-rear direction.

12. The connector as recited in claim 4, wherein:
the contact has a first spring portion and a second spring portion;
the first spring portion extends from the held portion to the movable end portion and has the pressed portion and a start point;
the second spring portion extends from the start point and has a free end and a contact point;
the contact point is to be electrically connected with the card and is located between the free end and the start point; and
when the pressed portion is moved downward, the start point and the free end are moved downward.

13. The connector as recited in claim 12, wherein the second spring portion extends rearward from the start point and has a rear end as the free end.

14. The connector as recited in claim 12, wherein:
the first spring portion has a first beam, a second beam and a coupling portion;
the coupling portion couples the first beam and the second beam to each other in the lateral direction;
the contact has a first pressed portion and a second pressed portion each of which works as the pressed portion;
the first pressed portion is a part of the first beam, and the second pressed portion is a part of the second beam; and
the contact point is located between the first beam and the second beam in the lateral direction.

15. The connector as recited in claim 14, wherein:
the first spring portion has a connection end;
the connection end couples an end portion of the first beam and an end portion of the second beam to each other;
the contact has a third pressed portion which works as the pressed portion;
each of the start point and the third pressed portion is a part of the connection end; and
the movable end portion extends from the connection end.

16. The connector as recited in claim 14, wherein when seen along the lateral direction, the free end is located below an upper surface of the first beam and an upper surface of the second beam.

* * * * *